April 15, 1930. W. V. LUDLAM 1,755,011
AIR CLEANER OR FILTER FOR CARBURETORS
Filed Sept. 15, 1927
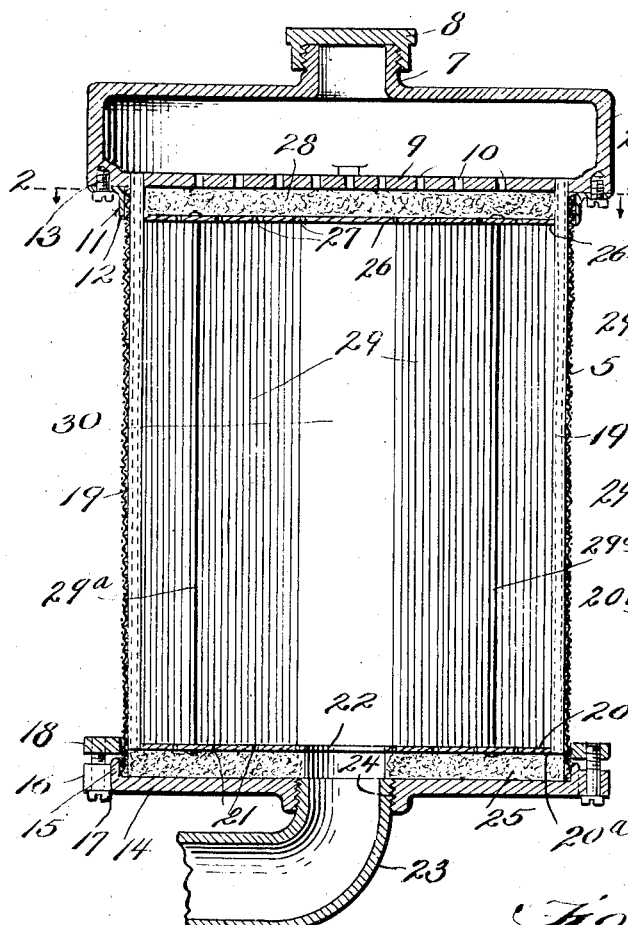
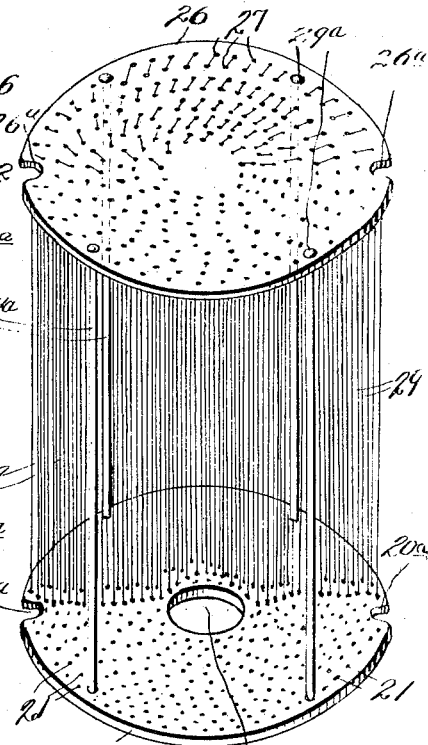
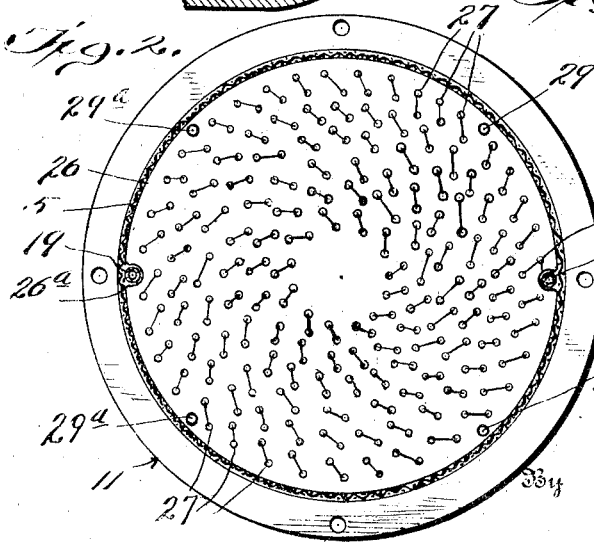
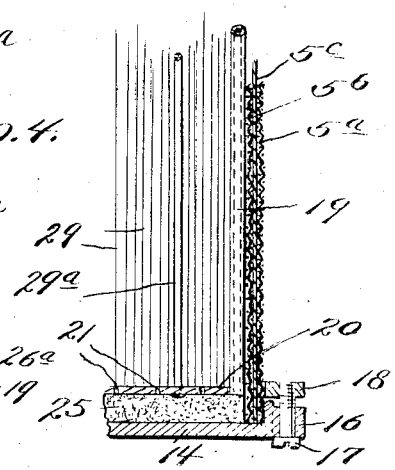

Patented Apr. 15, 1930

1,755,011

UNITED STATES PATENT OFFICE

WARREN V. LUDLAM, OF MERIDIAN, MISSISSIPPI

AIR CLEANER OR FILTER FOR CARBURETORS

Application filed September 15, 1927. Serial No. 219,758.

This invention relates to an air cleaner or filter particularly adapted for application to an internal combustion engine and specifically applicable to the carburetor of the latter. The present invention involves a simplified improvement of the structure disclosed in my pending application Serial No. 147,303, filed November 9, 1926.

As in my original structure, the air is purified and relieved of dirt and dust, and in this condition is supplied to the carburetor to render the latter more effective in its operation with material advantages to the operation of the motor to which the combustible mixture, including the cleaned air is fed.

In the original structure of air cleaner as embodied in the said application Serial No. 147,303, both forms of the air cleaner or filter shown include an outer enclosing casing, and one form comprises an annular inlet passage traversed by a spiral screw blade surrounding an enclosed circular frame or cylinder. In the present construction the casing and annular inlet passage with spiral screw blades have been eliminated, but the same general principle of operation is involved and includes structural means to render the parts of the improved cleaner and filter easily accessible and removable to maintain the cleaner or filter in a superior serviceable condition, and also comprises specific means for taking up and liberating and separating from the incoming air particles of dust and dirt. The present simplified improvement consists in the novel construction and arrangement of parts which will be more fully hereinafter described and claimed.

In the drawing:—

Fig. 1 is a transverse vertical section of an air cleaner or filter embodying the features of the invention.

Fig. 2 is a horizontal section on the line 2—2, Fig. 1.

Fig. 3 is a detail perspective view of the inner removable dust and dirt separating member with hairs or bristles broken away and partially removed.

Fig. 4 is a detail transverse section of a portion of the cleaner or filter showing a modification of the structure.

The numeral 5 designates, Figs. 1, 2 and 3 a surrounding enclosure which is reticulated or formed of a single wire gauze of a single thickness of suitable mesh, and providing the sole outer covering for the body of the improved cleaner or filter. This outer enclosure is detachably connected at its upper end to a chambered cap 6 which constitutes an oil chamber and has an upper filling inlet 7 with a removable cap 8 and a bottom 9 with a series of feed openings 10 therethrough. The means for detachably connecting the upper end of the enclosure 5 to the cap 6 preferably consists of an angle ring 11 of which the vertical flange 12 surrounds and is secured, as by soldering, to the exterior of the enclosure at the upper end of the latter, together with screws 13 extending through the horizontal flange of said ring and engaging the bottom 9 of the cap 6. The lower end of the enclosure is seated against an annular base 14 having an upwardly projecting flange 15 which surrounds the lower end of the enclosure and also having lugs 16 projecting outwardly therefrom. Screws 17 extend through the lugs 16 and engage a lower ring 18 which surrounds and is secured, as by soldering, to the enclosure 5 adjacent the lower end of the latter. The enclosure 5 extends between the base 9 of the chamber 6 and the base 14 of the cleaner, and oil feeding pipes 19 extend through the base 9 and are secured to said base as by screw threads. The cleaner or filter includes an inner removable receiving member comprising lower and upper diaphragms or heads 20 and 26 formed, respectively, with edge recesses 20ª and 26ª to loosely fit over and partially embrace the pipes 19, and also with a plurality of openings 21 and 27. The lower ends of the pipes 19 extend through openings in the lower diaphragm 20 and terminate coincidentally with the lower side of the said diaphragm, which diaphragm is spaced a predetermined elevation above the base 14, and has an enlarged central opening 22 which forms a passage to an elbow pipe 23 adapted to be connected to a carburetor, said pipe 23 being screwed in a central opening 24 of the base 14. Between the diaphragm 20 and the base 14 is a pad or filling 25 of absorbent material, said pad or filling occupying the space between the base 14 and the diaphragm around the openings 22 and 24. The upper similar diaphragm 26 is spaced from the base 9 of the chamber 6, and is devoid of an enlarged central opening or passage similar to the opening 22 in the lower diaphragm 20. The upper diaphragm 26 is spaced from the base 9 at approximately the same distance as the diaphragm 20 is located above the base 14, and above the diaphragm 26 and between the latter and base 9, is a pad or filling 28 of absorbent material directly under and in direct communication with the openings 10 in the said base 9.

Between the two diaphragms 20 and 26 and terminally secured thereto are a plurality of vertical filaments consisting of hairs or bristles 29 which are arranged around a central open passageway 30, and continue outwardly fully to the enclosure 5. These hairs or bristles are threaded through the openings 27 of the upper diaphragm 26 as shown by Fig. 3, and passed through the openings secured to the lower diaphragm 20 after having been passed through the lower openings 21. The openings 21 and 27 are of larger diameter than the hairs or bristles 29 to form passages, the hairs or bristles 29 being regularly spaced and stretched taut so as to retain their position within the enclosure 5. The two diaphragms 20 and 26 with which the hairs or bristles 29 are directly associated are also connected by wires 29ª which are rigid and serve as supporting means for sustaining this removable member structure, and holding the said member parts together during removal and resetting of the member. This removable member in view of the edge recesses 20ª and 27ª of the respective diaphragms 20 and 26 can be readily separated from the pipes 19, so as to relieve the hairs or bristles 29 of accumulations of dust and grit.

When the screws 13 securing the ring 11 to the base 9 of the chamber 6 are removed, said chamber and with it the pipes 19 may be lifted out of the enclosure 5, whereupon the inner cleaning or filtering member comprising the heads 20 and 26, the spacing wires 29ª, and hairs or bristles 29 can be lifted out of the upper end of the outer enclosure 5. Or the screws 17 securing the lower ring 18 to the base 14 may be removed, whereupon cap 6 and pipes 19 may be removed to permit access to the inner cleaning or filtering member and base 14. The pipes 19 are located close to the inner side of the outer enclosure 5, and the peripheries of the diaphragms 20 and 26 are also close to or abut the said enclosure, in order that the interior serviceable cleaning area of the removable member may be as clear as possible. The spacing wires 29ª for the diaphragms or heads 20 and 26 will also be placed to the best advantage in the removable member, and will be only of such size or diameter as to practically serve their purpose.

Fig. 4 shows a modified form of the outer enclosure, wherein is comprised an outer wire gauze wall 5ª, an inner similar wire gauze wall 5ᵇ spaced from the wall 5ª, and an interposed coarse woven fabric or cloth interceptor 5ᶜ closely fitting and held between the walls 5ª and 5ᵇ. This double wire gauze wall enclosure with the interceptor of cloth adds materially to the effectiveness of the cleaning or filtering of the incoming air, the interceptor 5ᶜ acting to relieve the air of the larger particles of grit or dirt before the air reaches the hairs or bristles 29 which take up and hold the less coarse grit or dirt carried by the air.

In the preparation of the improved cleaner and filter for use, the chamber 6 is supplied with oil and closed, and the oil from this chamber passes down through the openings 10 in the base 9, and permeates or saturates the filling or absorbent material 28, and also passes through the pipes 19 to and saturates the lower pad or filling 25. The oil from the upper pad or filling 28 passes through the openings 27 and through capillarity and gravity descends over and covers the hairs or bristles 29, the oil carried by the lower pad or filling 25 preventing the hairs or bristles from becoming too dry or from carrying insufficient oil to perform their functions, and also serving as a lower receiving means for the surplus oil that may pass over the hairs or bristles. The air is drawn through the reticulated enclosure 5, or the modified enclosure as shown by Fig. 4, and between the hairs or bristles 29 by the suction of the motor created through the pipe 23 and the opening 22 and central passage 30, and the dust and grit carried by the air is collected and remains on the oil covered hairs or bristles 29, and the cleaned or filtered air is drawn to the center and exits through the passage 30 and opening 22 and passes into and through the pipe 23, and thence to the carburetor. The inwardly drawn dust and grit laden air engages the hairs or bristles 29 fully from the top to the bottom of the latter, between the diaphragms 20 and 26, and a large cleaning area is thus provided. In view of the relatively close disposition of the hairs or bristles 29, the volume of dust and grit laden air is thoroughly cleaned or filtered and the air passing out through the pipe 23 will be in condition to advantageously mix with the remaining components of the combustible mixture and render the carburetor more effective in its operation and increase the efficiency of the combustible mixture and the motor. The single reticulated enclosure 5, Figs. 1, 2 and 3, and the modified form of enclosure, Fig. 4, will also act to materially preliminarily clean the air.

It is proposed to apply the improved air cleaner or filter to any form of carburetor to which it may be adapted, and to make such changes and modifications as fairly fall within the scope of the pending claims.

What is claimed as new is:—

1. An air cleaner of the class specified, comprising an enclosing reticulated air inlet casing provided with an oil receptacle, a series of filaments to which oil is fed from said receptacle and arranged in substantially parallel relation longitudinally within the casing around a central passage having an outlet at one end of the cleaner, and a pipe connection communicating with the outlet of the passage for attachment to a carburetor, the larger particles of dust and grit being separated from the air in its passage through the reticulations of said casing and the smaller particles of dust contained in the air being deposited on the oil carrying filaments during its passage therebetween, the purified air being liberated through the said passage.

2. An air cleaner of the class specified, comprising a reticulated enclosing casing forming the outer cover of the cleaner and provided at one extremity with an oil receptacle, a removable grit and dust receiving member within the casing and comprising a series of longitudinally extending filaments to which the oil is fed, the filaments being arranged around a central passage communicating with an outlet at one extremity of the cleaner, and a pipe connection attached to the outlet for application of the cleaner to a carburetor.

3. An air cleaner of the class specified, comprising an outer reticulated casing through which dust laden air is drawn to the interior of the cleaner, an oil receptacle at one extremity of the cleaner, spaced and united diaphragms removably mounted within the casing and having a series of longitudinally extending filaments connected thereto and to which oil is fed from the oil receptacle, the filaments being arranged around a central open passage having an outlet at one extremity of the cleaner, and a pipe connected to the outlet for application of the cleaner to a carburetor.

4. An air cleaner of the class specified, comprising an outer reticulated casing which admits atmospheric dust laden air throughout the whole area thereof to the interior of the cleaner, the reticulated casing forming the outer cover of the cleaner, an oil receptacle at one extremity of the cleaner having a base with openings therethrough, an inner removable receiver consisting of spaced and rigidly held diaphragms having openings therethrough, and filaments extending longitudinally and terminally connected to the respective diaphragms and arranged around a central open passage having an outlet at one end, and a pipe connected to the outlet for applying the cleaner to a carburetor.

5. An air cleaner of the class specified, comprising, an outer reticulated casing through the entire area of which atmospheric dust laden air is admitted to the interior of the cleaner, a receiver removably mounted within the casing and having upper and lower diaphragms with longitudinal filaments connected thereto and arranged around a central open passage having an outlet at one end, a base and an oil receptacle at opposite extremities of the casing for supplying oil to the filaments and holding the parts intact, absorbent fillings between the upper diaphragm and the oil receptacle and also between the lower diaphragm and base, and a pipe connected to the outlet and adapted to be attached to a carburetor.

6. An air cleaner of the class specified, comprising an outer reticulated casing which admits atmospheric dust laden air throughout the entire area thereof to the interior of the cleaner, an oil receptacle at one extremity of the casing and having openings through the base thereof and a base structure at the other end of the casing, an inner removable receiver consisting of oppositely disposed diaphragms having longitudinal filaments associated therewith and also formed with edge recesses, the diaphragms having openings therethrough at points engaged by the filaments and the latter arranged around a central clear passage having an outlet at one end, pipes connected to the oil receptacle loosely passing through the recesses of the diaphragms, an absorbent filling interposed between the upper diaphragm and the oil receptacle, a filling below the lower diaphragm and base, and a pipe connected to said outlet for operatively applying the cleaner to a carburetor.

7. An air cleaner of the class specified, comprising a base at one extremity and an oil chamber at the opposite extremity, an outer casing consisting of an outside reticulated wall, an inside reticulated wall and an interposed cloth wall, a removable member within the said composite casing and having longitudinally extending filaments to which the oil is fed, the filaments being arranged around a central passage having an outlet through the base, and a pipe connection attached to the outlet for application of the cleaner to a carburetor.

In testimony whereof I have hereunto set my hand.

WARREN V. LUDLAM.